July 29, 1958     I. H. FILLER     2,844,994
CONVERTIBLE SUNBATHING-EYESHIELD AND SUN GLASSES
Filed May 20, 1956     2 Sheets-Sheet 1
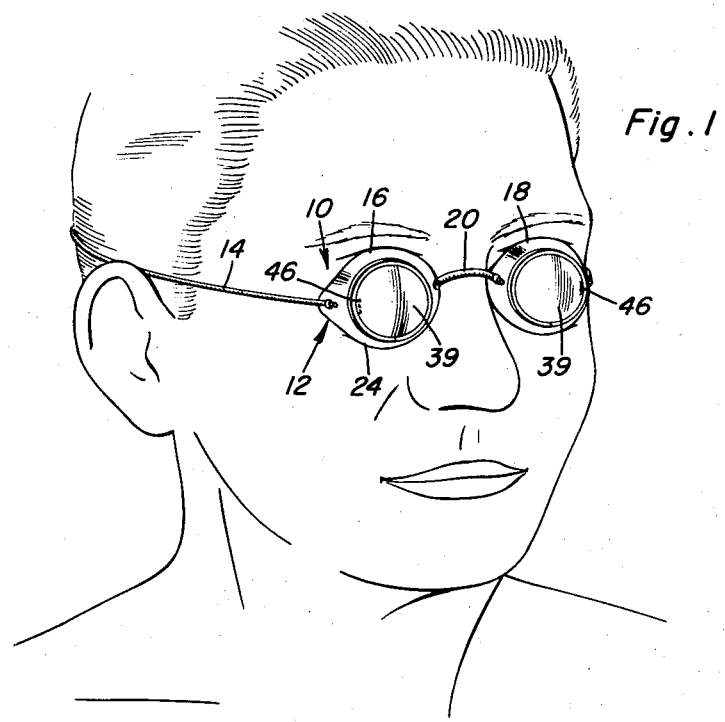
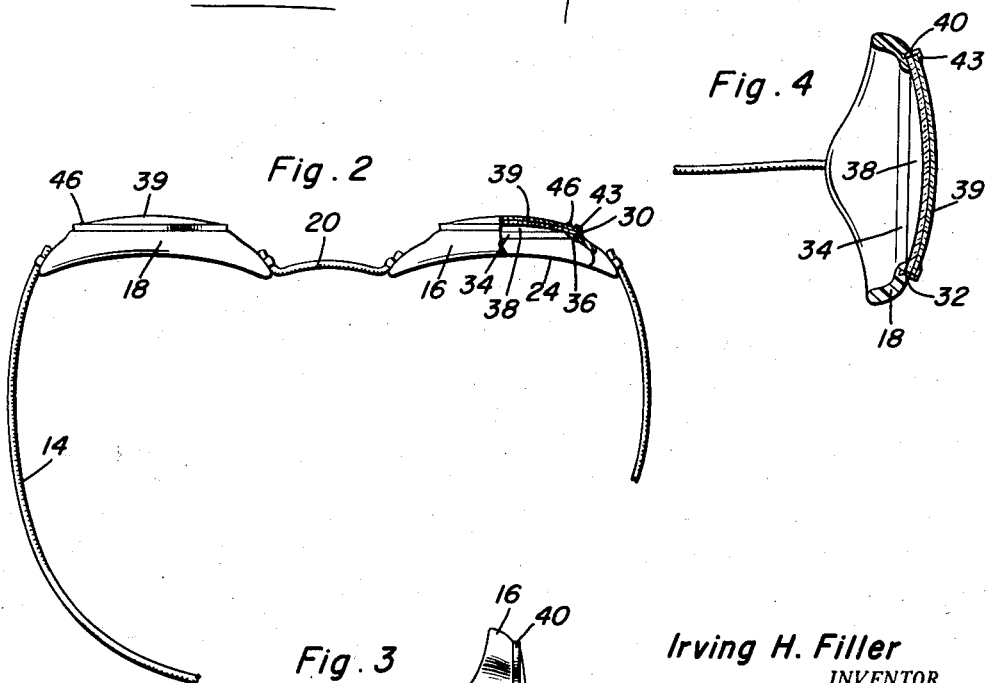
Irving H. Filler
INVENTOR.
BY *Clarence A. O'Brien*
*and Harvey B. Jackson*
Attorneys July 29, 1958   I. H. FILLER   2,844,994
CONVERTIBLE SUNBATHING-EYESHIELD AND SUN GLASSES
Filed May 20, 1956   2 Sheets-Sheet 2
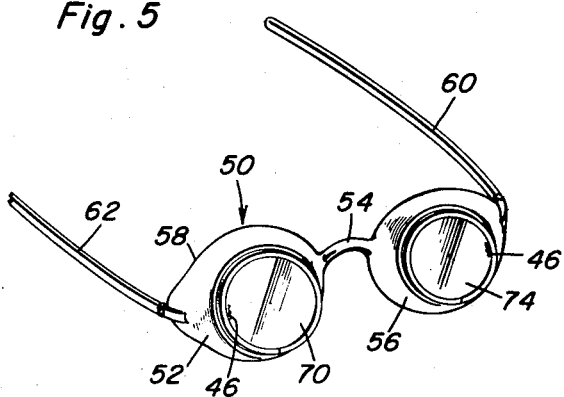
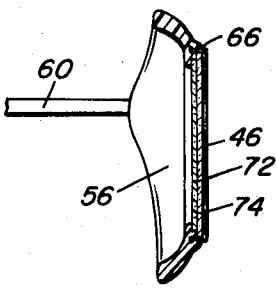
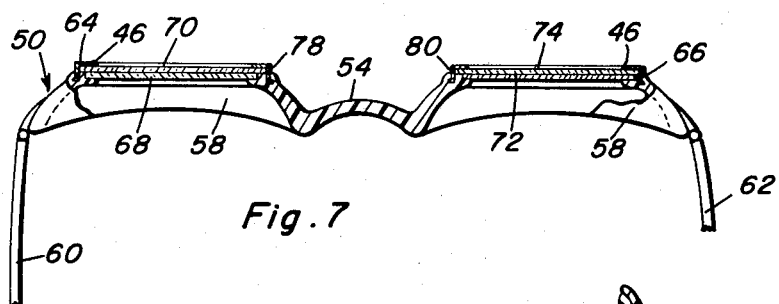
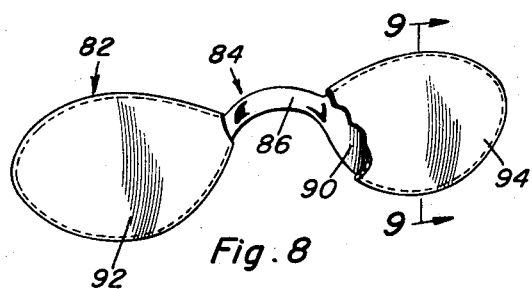
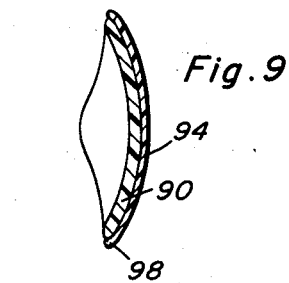
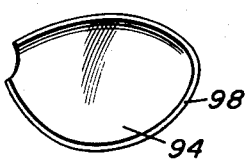
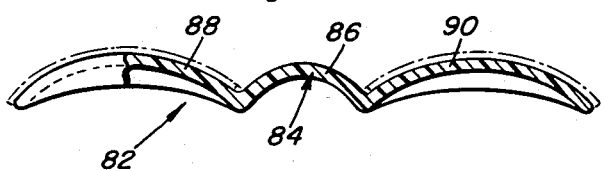
Irving H. Filler
INVENTOR.

United States Patent Office 2,844,994
Patented July 29, 1958

2,844,994
CONVERTIBLE SUNBATHING-EYESHIELD AND SUN GLASSES

Irving H. Filler, Bethesda, Md.

Application March 20, 1956, Serial No. 572,713

2 Claims. (Cl. 88—41)

The present invention relates to protectors for human eyes and particularly to a variable density convertible type of sun glasses and eye shield primarily useful for beach and sun bathing wear.

In connection with the nature and substance of the invention, the proposed design, although constructed in one compact unit is considered to be a decided improvement over either and both the eye shields and sun glasses as presently available on today's market. This is so in that the invention combines all of the advantageous features of both while, at the same time eliminates the objectionable features. It is apparent that eye shields and sun glasses as manufactured today are not entirely satisfactory when used for sun bathing, either at the beach or inland. Although eye shields will protect the eyes by excluding windblown particles and light, and although some have added advantages in that they will permit an even tanning of the face without leaving a disfiguring white ring of unexposed skin in the area of the eyes, they have a great disadvantage in that while they are being worn the wearer is totally blinded to the many interesting events in his vicinity on the beach, at the pool or in some other area. Heavily silvered or darkly tinted glasses have the advantage of allowing the wearer unrestricted vision even while he is facing in the general direction of the sun, but they have two major disadvantages when worn for sun bathing in that they do not protect or shield the eyes from the windblown particles and from rays of light entering from the sides and secondly, when worn facing the sun for any appreciable length of time they leave a disfiguring ring of unexposed skin around the area of the eyes. Accordingly, it is the object of the present invention to eliminate entirely the objectionable features of both while retaining the advantageous ones, and in addition including a most important element of convenience by combining an eye shield and sun glass into a single, convertible, compact unit which is capable of protecting the eyes from windblown particles while simultaneously affording the wearer ample vision even while facing directly into the sunlight without leaving a disfiguring ring of unexposed skin in the area of the eyes.

A further object of the invention is to provide a device made in accordance with the previous object in which the structure is such as to be instantaneously convertible into a pair of sun glasses from an opaque eye shield and convertible from a pair of sun glasses to an eye shield, permitting the wearer, if he desires to temporarily completely rest his eyes, to exclude all rays of light from his eyes.

A further object of the invention is to provide a device which functions primarily as an eye shield but which may also be used as a pair of sun glasses, the device including two superposed light polarizing elements for each eye, one element being movable with respect to the other in order that the light transmission through the pairs of elements may be regulated in accordance with the desires of the wearer. A feature of the invention in this regard is the fact that the eye units may have the light density varied independently of each other, whereby an individual may permit the light to pass only through one part of the eye shield or may adjust the eye shield such that more or less light passes through the individual pairs of polarizing elements.

A further object of the invention is to provide an eye shield that has an opaque frame which has for each eye an edge design to fit flush and to conform to the contours of the fleshy and skeletal structure around the socket of the eye in such a manner as to exclude the entry of light rays, except through the polarizing panels when they are in the non-opaque position, whereby inasmuch as the periphery of the frame conforms with that of the sockets of the human eyes, there will be no disfiguring ring of unexposed skin around the eyes when worn in sun bathing.

Finally, one of the aims of the invention is to provide a combined and convertible eye shield and sun glass containing various features of convenience, utility, economy and appearance that should make it attractive and desirable to the sun bather. The convenience is involved in the dual purpose eye piece which is embodied in one compact unit. Further convenience and utility are embodied in that it is instantaneously convertible from an eye shield to a pair of sun glasses and vice versa. The utility is further demonstrated in that when the invention is being used as a pair of sun glasses the wearer is able to regulate the lenses to any degree of transparency that, depending upon the intensity of the sunlight at the time, he should desire. Additional utility and economy is manifest in that the invention could be used as a conventional hood-wink for activities other than sun bathing. The personal appearance is important. The sun bather can wear the eye piece as long as he wishes, either as a sun glass or as an eye shield without being disfigured by a ring of unexposed skin around the eyes at the end of the day.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of one, possibly but not necessarily the preferred, embodiment of the invention showing the same in use upon a typical sun bather;

Figure 2 is a fragmentary top plan view of the eye shield of Figure 1, parts being broken away in section to illustrate internal detail;

Figure 3 is a fragmentary elevational side view of the eye shield of Figure 2;

Figure 4 is a transverse sectional view of the eye shield of Figure 2;

Figure 5 is a perspective view of a slightly modified form of the invention;

Figure 6 is a transverse sectional view of the invention embodiment of Figure 5;

Figure 7 is a top plan view of the structure in Figure 5, parts being shown in section to illustrate internal detail;

Figure 8 is a perspective view of a further modification;

Figure 9 is a sectional view taken on the line 9—9 of Figure 8;

Figure 10 is a top plan view of the structure in Figure 8; and

Figure 11 is an elevational view of one of the opaque detachable shields used in Figure 8.

In the accompanying drawings there are several embodiments of the invention which exemplify how the principles may be practiced. In Figures 1–4 I have illustrated a device which is capable of being converted from an eye shield to a pair of sun glasses and from a pair of sun glasses to an eye shield. Inasmuch as sun glasses form in part a shielding function for the eyes, the expression "eye shield" as used herein is intended to include both the eye shield concept as well as the protection of the eyes by reducing the light rays and/or their intensity prior to impinging upon the retina of the eye. With this understanding eye shield 10 comprises an opaque frame 12, the periphery of which is to conform with that of the socket of the human eye so as to cover no portion of the face other than the area of the eye socket alone, and to which there is an elastic band 14 connected at its ends. This band is adapted to extend around the head of the wearer in order to hold the frame 12 in place on the sun bather. Frame 12 in the illustrated case consists of two units 16 and 18 connected by a flexible and elastic nose piece 20. This nose piece is a length of elastic cord stapled or otherwise fixed to the confronting sides of the units 16 and 18. Although other materials of construction may be used, it is preferred that an opaque plastic form the small shells that make up units 16 and 18.

Each unit, for example unit 16, has an edge 24 curved to fit flush and conform to the contours of the fleshy and skeletal structure around the socket of one of the eyes of the wearer. The curvature is such that the opaque shell excludes the light rays and prevents the formation of a disfiguring ring of unexposed skin in the area of the eye. Unit 16 which constitutes part of frame 12 is fitted for the right eye of the wearer while unit 18 is fitted for his left eye. Staples or other means fastening the ends of the flexible and elastic cord 14 are used in an unobtrusive manner near the side end parts of the two units.

Each unit of the frame has an aperture in it, for example aperture 30 in unit 16 and aperture 32 in unit 18. An annular rib 34 is in aperture 32, while a similar annular rib 36 is in aperture 30. The ribs 34 and 36 form shoulders on which the fixed polarizing element 38 is mounted and frictionally held in place. Polarizing element 38 constitutes a lens and may be made of any of the commercially available polarizing material, preferably a synthetic resinous plastic as described in Patent No. 2,565,362. A mating light polarizing element 39 is superposed on the element 38, each having the same cross-sectional curvature. Means mounting the movable light polarizing element 39 for rotation are operatively connected with it. They comprise preferably a very thin and light weight metal annulus 40 that is seated in aperture 32 and that has an inwardly extending annular lip 43 overlying the peripheral edge of polarizing element 39. In this way the polarizing element is mounted for rotation with respect to the polarizing element 38. Suitable means for causing such relative rotation are operatively connected to the light polarizing element 39. One example of such means is seen in Figure 1 where on each outer light polarizing element 39 there is one or more very small and almost undiscernable projections 46 located near lip 43, the latter being cut away to allow movement of the projections and the element 39.

In use of this embodiment of the invention and all others described herein, the wearer has the option of using the eye shield as such or as a pair of sun glasses, although the former is the more general intention herein. After being applied to the head as shown in Figure 1 when the wearer decides to admit light he rotates his outer light polarizing element until the light transmissive quality of the units 16 and 18 are to his satisfaction for each eye. This may be zero light transmission or may be anywhere between the range of zero and maximum depending upon the personal likes and dislikes of the user at any particular instant.

Attention is now invited to Figures 5–7 where a slightly modified form of the eye shield is illustrated. This form of eye shield 50 is extremely similar to that of Figure 1.

Eye shield 50 is made of a frame 52 of a material similar to the units 16 and 18 of frame 12. In lieu of the flexible nose piece, however, there is a rigid nose piece 54 connecting the confronting and adjacent sides of the units 56 and 58. In addition, the flexible and elastic cord 14 has been substituted by a pair of legs 60 and 62 hingedly connected to the outer ends of the units 56 and 58. The shape of the units is the same as the shape of units 16 and 18, and they have central apertures 64 and 66 in which to accommodate pairs of light polarizing elements. There are elements 68 and 70 in aperture 64, while aperture 66 has light polarizing elements 72 and 74 therein. The innermost elements 68 and 72 are fixed in place while the outer elements 70 and 74 are mounted for rotation in the annulus 78 and the annulus 80. The remainder of the structure and the complete operation of this form of eye shield is identical to that previously described with the exception that the embodiment of Figure 5 shows that the curvature of the light polarizing elements may be reduced to zero.

In Figures 8–11 there is a very simplified form of the eye shield and sunglass. Here sun glass 82 comprises a pair of transparent eye covering units 88 and 90 made preferably of plastic and connected by a nose piece 86. Each unit has a shape to conform to the contours of the fleshy and skeletal structure of the sockets of the eyes as described in connection with the edges 24 of the units 16 and 18. There are two opaque, detachable shields 92 and 94 to be used on units 88 and 90. These shields are to be constructed preferably of plastic with the proper elasticity to permit them to be snapped conveniently into position to provide the wearer with an effective eyeshield that will exclude all rays of light. In use of this form of eye shield, the wearer will be in a prone position with the frame resting across the bridge of his nose. He has the option, then, of using the convertible eyeshield and sunglass with or without shields 92 and 94.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A sunbathing-eyeshield convertible to sun glasses, comprising the combination of two opaque frames, one frame for each eye, each frame having a substantially oval shaped periphery which is to conform with that of the socket of the human eye so as to cover no portion of the face other than the eye-lids and the area of the eye socket alone in order to prevent the formation of a disfiguring ring of unexposed skin in the area of the eye, and that has an edge curved to fit flush and conform to the contours of the fleshy and skeletal structure around the socket of the eye in a manner to exclude all light rays, each frame having a circular viewing aperture, a fixed polarizing sheet mounted on each frame covering said aperture, a rotatable circular polarizing sheet with means mounting said rotatable polarizing sheet on said frame, said rotatable polarizing sheet being superposed over said fixed polarizing sheet whereby said rotatable polarizing sheet may be rotated with respect to said fixed polarizing sheet so that the light transmission of said elements may be varied through a range from zero to maximum, and operable means connected with each movable polarizing sheet for rotating the latter with respect to its fixed polarizing sheet.

2. The sunbathing-eyeshield of claim 1 in which the said mounting means comprise an annulus having lip portions overlying the peripheral part of said rotatable polarizer.

(References on following page)

References Cited in the file of this patent

UNITED STATES PATENTS

| | | |
|---|---|---|
| 2,377,313 | Casier | June 5, 1945 |
| 2,408,273 | Sager | Sept. 24, 1946 |
| 2,413,193 | Robblee | Dec. 24, 1946 |
| 2,665,423 | Weber | Jan. 12, 1954 |
| 2,709,256 | Baratelli | May 31, 1955 |

FOREIGN PATENTS

| | | |
|---|---|---|
| 272,944 | Switzerland | Apr. 16, 1951 |
| 1,036,181 | France | Apr. 22, 1953 |